(12) United States Patent
Sato

(10) Patent No.: US 11,969,816 B2
(45) Date of Patent: Apr. 30, 2024

(54) PLATED METAL BONDING METHOD AND PLATED METAL BONDING APPARATUS

(71) Applicant: ULTEX CORPORATION, Fukuoka (JP)

(72) Inventor: Shigeru Sato, Fukuoka (JP)

(73) Assignee: ULTEX CORPORATION, Fukuoka (JP)

( * ) Notice: Subject to any disclaimer, the term of this patent is extended or adjusted under 35 U.S.C. 154(b) by 306 days.

(21) Appl. No.: 16/950,615

(22) Filed: Nov. 17, 2020

(65) Prior Publication Data

US 2021/0229209 A1    Jul. 29, 2021

(30) Foreign Application Priority Data

Jan. 29, 2020   (JP) ................. 2020-012556

(51) Int. Cl.
*B23K 20/00* (2006.01)
*B23K 20/10* (2006.01)
*B23K 103/16* (2006.01)

(52) U.S. Cl.
CPC ........ *B23K 20/10* (2013.01); *B23K 2103/166* (2018.08)

(58) Field of Classification Search
CPC .............. B23K 20/10; B23K 20/2275; B23K 2101/34; B23K 2103/08; B23K 2103/20; B23K 11/12; B23K 2101/18
See application file for complete search history.

(56) References Cited

U.S. PATENT DOCUMENTS

| 6,222,150 | B1 * | 4/2001 | Nomura | B23K 20/16 228/194 |
| 7,850,059 | B2 * | 12/2010 | Kobayashi | B23K 26/211 228/178 |
| 7,935,908 | B2 * | 5/2011 | Nakagawa | B23K 26/0093 228/125 |
| 8,492,005 | B2 * | 7/2013 | Nakagawa | B23K 20/02 228/208 |
| 9,174,298 | B2 * | 11/2015 | Kasukawa | B23K 26/244 |
| 9,272,361 | B2 * | 3/2016 | Nakagawa | B23K 20/16 |
| 9,818,716 | B2 * | 11/2017 | Fujino | H01L 23/48 |
| 10,096,570 | B2 * | 10/2018 | Yoneda | H01L 24/27 |
| 10,105,777 | B2 * | 10/2018 | Nishikawa | C25D 3/38 |
| 10,804,236 | B2 * | 10/2020 | Joshi | H01L 24/27 |

(Continued)

FOREIGN PATENT DOCUMENTS

| JP | 2007-118059 A | 5/2007 |
| JP | 2008-080383 A | 4/2008 |
| JP | 2012-187597 A | 10/2012 |

OTHER PUBLICATIONS

Construction (Fabrication of Edges, Joints, Seams, and Notches, www.tpub.com:80/steelworker2/22.htm Mar. 5, 2019 (Year: 2019).*

(Continued)

*Primary Examiner* — Erin B Saad
(74) *Attorney, Agent, or Firm* — Lucas & Mercanti, LLP

(57) ABSTRACT

A stable bonding processing for metal, of which at least a part is plated, is provided. A plated metal bonding apparatus performs bonding of a first metal and a second metal. At least one from among the first metal and the second metal has a plated bonding portion where the bonding processing is to be performed. A bonding processing unit performs bonding of the first metal and the second metal using sound vibration and/or ultrasound vibration. The bonding processing unit performs the bonding processing using a plated material or otherwise using a metal portion in a state in which a plating material has been removed.

5 Claims, 7 Drawing Sheets

(56) References Cited

U.S. PATENT DOCUMENTS

| | | | | |
|---|---|---|---|---|
| 2006/0150387 | A1* | 7/2006 | Kobayashi | B23K 20/2275 |
| | | | | 29/458 |
| 2008/0026247 | A1* | 1/2008 | Nakagawa | B23K 33/008 |
| | | | | 428/656 |
| 2008/0241572 | A1* | 10/2008 | Miyamoto | B23K 11/115 |
| | | | | 219/118 |
| 2010/0190055 | A1* | 7/2010 | Khakhalev | H01M 50/536 |
| | | | | 228/110.1 |
| 2011/0052935 | A1* | 3/2011 | Nakagawa | B23K 20/02 |
| | | | | 228/125 |
| 2011/0123825 | A1* | 5/2011 | Sakurai | B23K 26/22 |
| | | | | 219/148 |
| 2011/0159313 | A1* | 6/2011 | Kasukawa | B23K 20/227 |
| | | | | 228/208 |
| 2022/0001483 | A1* | 1/2022 | Liu | B23K 11/115 |

OTHER PUBLICATIONS

Hayashi, et al., "Resistance Spot Welding of Galvanized Steel Sheets and Aluminum Alloy for Vehicles," Bulletin of Hokkaido University of Science, No. 45, 2018.

Office Action dated Oct. 28, 2022 for corresponding Japanese application No. 2020-012556, and English translation.

Notice of Reasons for Refusal dated Apr. 3, 2023 for the corresponding Japanese patent application No. 2020-012556, with English translation (14 pages).

* cited by examiner

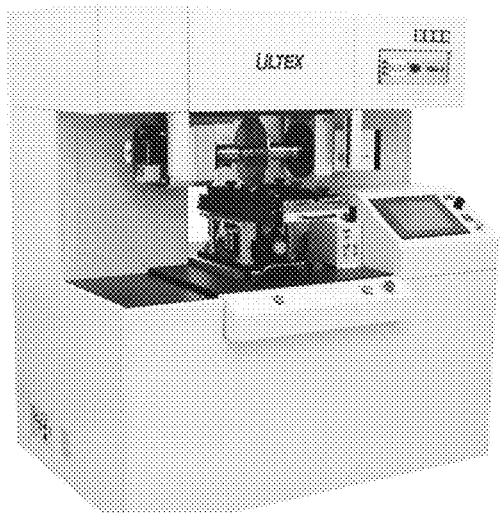
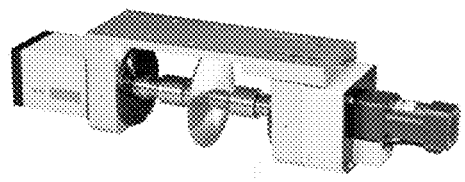
Fig. 2A
Fig. 2B
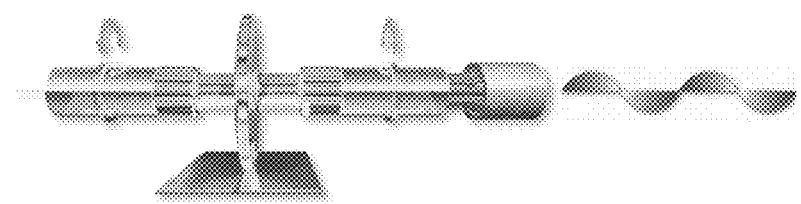
Fig. 2C
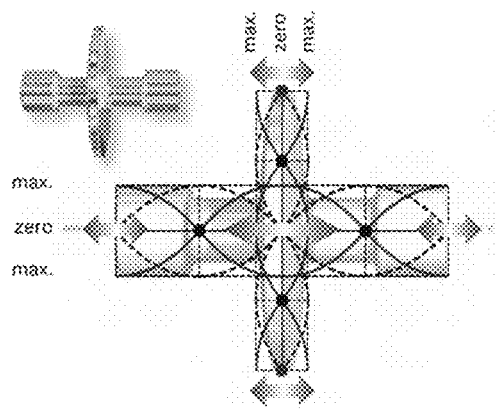
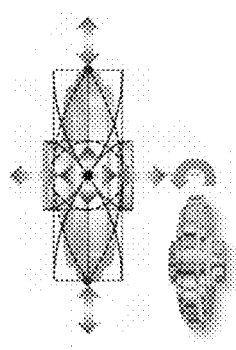
Fig. 2D
Fig. 2E

PLATED METAL BONDING METHOD AND PLATED METAL BONDING APPARATUS

CROSS REFERENCE TO RELATED APPLICATION

This application claims the priority of Japanese Patent Application No. 2020-012556 filed on Jan. 29, 2020, and the entire content thereof is incorporated herein by reference.

TECHNICAL FIELD

The present invention relates to a plated metal bonding method and a plated metal bonding apparatus, and particularly to a plated metal bonding method or the like for supporting bonding of plated metal.

BACKGROUND ART

For example, as described in Non-patent document 1, bonding processing is known for galvanized steel plates or the like.

CITATION LIST

Patent Literature

[Non-patent document 1]
Hayashi, et al., "Resistance Spot Welding of Galvanized Steel Sheets and Aluminum Alloy for Vehicles", Bulletin of Hokkaido University of Science, No. 45, 2018.

SUMMARY OF INVENTION

Technical Problem

However, in a case of performing bonding processing using such electric resistance spot welding or the like according to the current technology, such an arrangement is not capable of providing stable bonding.

Accordingly, it is a purpose of the present invention to provide a plated metal bonding method or the like suitable for supporting stable bonding processing for metal of which at least a part is plated.

Solution of Problem

A first aspect of the present invention relates to a plated metal bonding method for bonding multiple metals. The plated metal bonding method includes bonding in which a bonding processing unit bonds multiple metals using sound vibration and/or ultrasound vibration. A part of or all the multiple metals have a plated bonding portion where bonding is to be performed. In the bonding, the bonding processing unit performs bonding using at least a part of a plating material and/or performs bonding using a metal portion in a state in which at least a part of the plating material is removed.

A second aspect of the present invention relates to the plated metal bonding method according to the first aspect. In the bonding, the bonding processing unit performs bonding for a bonding portion at a temperature that is not higher than a dissolution temperature of a plated metal.

A third aspect of the present invention relates to the plated metal bonding method according to the first or second aspect. In the bonding, the bonding processing unit performs bonding for a bonding portion at a temperature that is not higher than a dissolution temperature of a plating material.

A fourth aspect of the present invention relates to the plated metal bonding method according to any one of the first aspect through the third aspect. The bonding portion includes a first bonding portion and a second bonding portion to be subjected to bonding after the bonding of the first bonding portion. In the bonding, the bonding processing unit performs bonding of the first bonding portion, cools the first bonding portion and the second bonding portion, and performs bonding of the second bonding portion.

A fifth aspect of the present invention relates to the plated metal bonding method according to any one of the first aspect through the fourth aspect. In the bonding, pressure is applied to the bonding portion by the bonding processing unit and/or a pressing portion. At least a part of the plating material in the bonding portion is moved by sound vibration and/or ultrasound vibration and the pressure.

A sixth aspect of the present invention relates to the plated metal bonding method according to the fifth aspect. In the bonding, a part of a plating material in the bonding portion is discharged from the bonding portion by sound vibration and/or ultrasound vibration and pressure. The bonding processing unit performs bonding of multiple metals in a state in which at least a part of a plating material is discharged.

A seventh aspect of the present invention relates to the plated metal bonding method according to any one of the first aspect through the sixth aspect. The multiple metals include a first metal and a second metal. At least one from among the first metal and the second metal is plated. In the bonding, the bonding processing unit performs bonding in a state in which the first metal is bent in a state in which the second metal is pinched by the first metal.

An eighth aspect of the present invention relates to a plated metal bonding apparatus configured to support bonding of multiple metals. The plated metal bonding apparatus includes a bonding processing unit configured to perform bonding of multiple metals using sound vibration and/or ultrasound vibration. A part of or all the multiple metals have a plated bonding portion where bonding is to be performed. The bonding processing unit performs bonding using at least a part of a plating material and/or performs bonding using a metal portion in a state in which at least a part of the plating material is removed.

It should be noted that the present invention may be provided as a computer program for controlling a computer configured to control a metal bonding apparatus configured to support bonding processing using sound vibration and/or ultrasound vibration so as to provide each aspect of the present invention. Also, the present invention may be provided as a computer-readable recording medium configured to record the above-described computer program.

Advantageous Effects of Invention

With each aspect of the present invention, bonding is performed using sound vibration and/or ultrasound vibration. Accordingly, even in a case of performing bonding of a plated metal, the bonding can be performed using a plating material. Alternatively, metal-metal bonding can be performed in a state in which such a plating material is removed. This provides stable bonding processing. In particular, bonding using such sound vibration and/or ultrasound vibration is capable of supporting bonding with low energy at a low temperature. This allows the occurrence of hydrogen brittleness to be prevented, for example.

BRIEF DESCRIPTION OF DRAWINGS

FIG. 2A shows the overall configuration of an actual example of the plated metal bonding apparatus 1 shown in FIG. 1A.

FIG. 2B shows an actuator portion shown in FIG. 2A.

FIG. 2C is a diagram showing a schematic configuration of a sound rotary system.

FIG. 2D is a diagram for explaining a horizontal vibration.

FIG. 2E is a diagram for explaining a vertical vibration.

FIG. 4A shows a state before the bonding in which the lid and the casing are fixed after a lid is folded over.

DESCRIPTION OF EMBODIMENTS

Description will be made with reference to the drawings regarding an example of the present invention. It should be noted that an embodiment of the present invention is not restricted to such an example described below.

Example

Figure 1A:
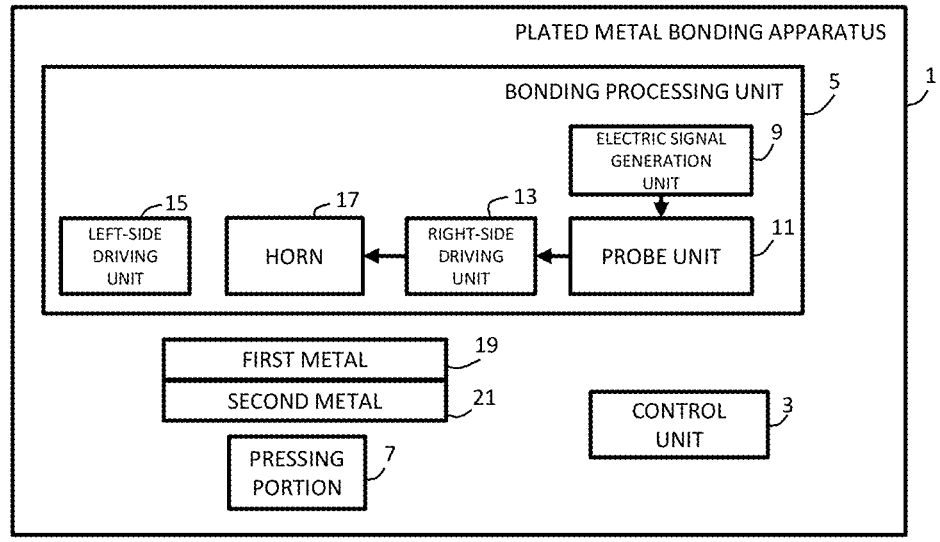
FIG. 1A is a block diagram showing an example configuration of a plated metal machining apparatus 1 according to an embodiment of the present invention.
Figure 1B:
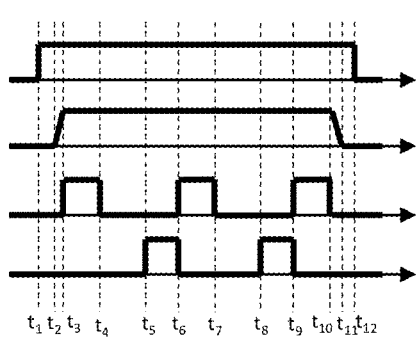
FIG. 1B is a time chart showing control signals.
Figure 1C:
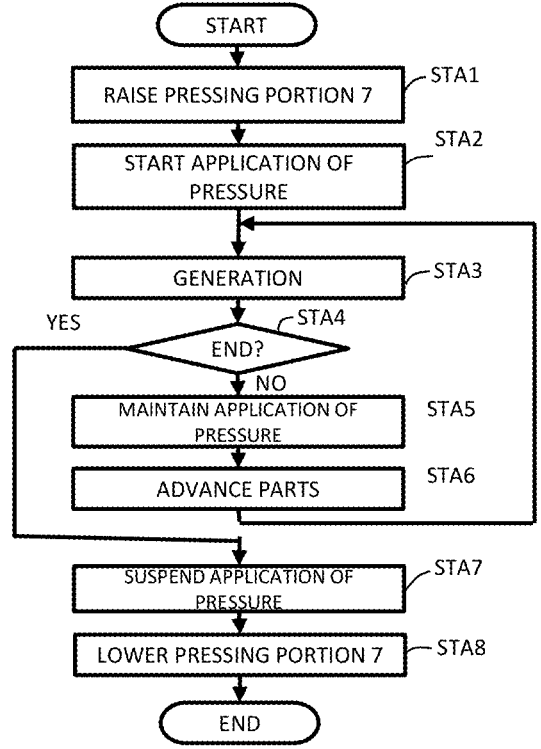
FIG. 1C is a flowchart showing an example of the operation.

FIG. 1A is a block diagram showing an example configuration of a plated metal bonding apparatus 1 according to an embodiment of the present invention. FIG. 1B is a time chart showing an example of control signals. FIG. 1C is a flowchart showing an example of the operation.

Referring to FIG. 1A, the plated metal bonding apparatus 1 includes a control unit 3, a bonding processing unit 5 (an example of a "bonding processing unit" in the present claims), and a pressing portion 7. The bonding processing unit 5 includes an electric signal generation unit 9, a probe unit 11, a right-side driving unit 13, a left-side driving unit 15, and a horn 17.

The control unit 3 is capable of controlling the operation of the plated metal bonding apparatus 1 using the control signals.

The bonding processing unit 5 performs bonding processing for a first metal 19 and a second metal 21 using sound vibration (vibration at a frequency that is lower than 20 kHz) and/or ultrasound vibration (vibration of 20 kHz or more). A portion to which such bonding is applied by the bonding processing unit 5 will be referred to as a "bonding portion". At least one from among the first metal 19 and the second metal 21 has a plated portion configured as a bonding portion. The first metal 19 and the second metal 21 may be, for example, a copper material, aluminum material, iron (steel) material, or the like. Examples of such plating include processing with solder, tin, zinc, nickel, etc.

In the bonding processing unit 5, the electric signal generation unit 9 generates an electric signal that corresponds to sound vibration and/or ultrasound vibration. The probe unit 11 converts the electric signal into mechanical vibration. The right-side driving unit 13 and the left-side driving unit 15 rotationally drive the horn 17 in a state in which the horn 17 is held via both its sides. The right-side driving unit 13 transmits the mechanical vibration generated by the probe unit 11 to the horn 17. The horn 17 resonates with the vibration thus transmitted. With this, the bonding processing unit 5 is capable of providing bonding processing using sound vibration and/or ultrasound vibration.

The pressing portion 7 (an example of a "pressing portion" in the present claims) is arranged below the first metal 19 and the second metal 21, and is configured to be moved up and down. Furthermore, the pressing portion 7 is capable of advancing the first metal 19 and the second metal 21 together with the rotation of the horn 17 as necessary. When the pressing portion 7 is raised, the horn 17 and the pressing portion 7 are set such that the first metal 19 and the second metal 21 are interposed between them. The pressing portion 7 is capable of applying pressure in such a state in which the first metal 19 and the second metal 21 are interposed between the horn 17 and the pressing portion 7. When the pressing portion 7 is lowered, the pressing portion 7 is displaced away from the first metal 19 and the second metal 21.

FIG. 1B shows an example of control signals, and specifically, a first control signal, a second control signal, a third control signal, and a fourth control signal, in this order from the top. The first control signal is used to control the up-and-down movement of the pressing portion 7. Specifically, when the first control signal is set to zero, the pressing portion 7 is set at its lowest position. Conversely, when the first control signal is set to 1, the pressing portion 7 is set at its highest position. The second control signal is used to instruct the pressing portion 7 to press the bonding portion. Specifically, when the second control signal is set to zero, the pressing portion 7 applies no pressure. Conversely, when the second control signal is set to 1, the pressing portion 7 presses the bonding portion with its maximum pressure. The third control signal is used to vibrate the horn 17. Specifically, when the third control signal is set to zero, the horn 17 does not vibrate. Conversely, when the third control signal is set to 1, the horn 17 vibrates. The fourth control signal is used to advance the first metal 19 and the second metal 21 by the rotation of the horn 17 provided by the right-side driving unit 13 and the left-side driving unit 15 and/or the pressing portion 7. Specifically, when the fourth control signal is set to zero, the first metal 19 and the second metal 21 are not advanced. When the fourth control signal is set to 1, the first metal 19 and the second metal 21 are advanced.

FIG. 1C is a flowchart showing an example of the operation of the plated metal bonding apparatus 1. The control unit 3 sets the first control signal to 1 so as to raise the pressing portion 7 (Step STA1, at the time point $t_1$ in FIG. 1B). Subsequently, the control unit 3 sets the second control signal to 1 so as to start to apply pressure between the horn 17 and the pressing portion 7 (Step STA2, at a period of time from $t_2$ up to $t_3$).

Subsequently, the control unit 3 sets the third control signal to 1 during a processing period (period of time from $t_3$ up to $t_4$) so as to perform bonding processing using sound vibration and/or ultrasound vibration (Step STA3). Subsequently, the control unit 3 judges whether or not the bonding processing is to be ended (Step STA4). When judgment is made that the bonding processing is to be ended, the flow proceeds to Step STA7. When the bonding processing is to be continued, the first metal 19 and the second metal 21 are held such that they are interposed and pressed between the horn 17 and the pressing portion 7 during a cooling period (period of time from $t_4$ up to $t_5$) (Step STA5). Subsequently, the first metal 19 and the second metal 21 are advanced by the horn 17 and/or the pressing portion 7 (Step STA6, in a period of time from $t_5$ up to $t_6$), following which the flow returns to step STA3. The Steps STA3 through STA6 are repeated a predetermined number of times (see the period of time from $t_6$ up to $t_n$).

In Step STAT, the control unit 3 sets the second control signal to zero so as to suspend the application of pressure between the horn 17 and the pressing portion 7 (period of time from $t_{10}$ up to $t_{11}$). Subsequently, the control unit 3 sets the first control signal to zero so as to lower the pressing portion 7 (step STA8, the time point $t_{12}$ in FIG. 1B).

Each of FIG. 2A and FIG. 2B is a diagram showing an actual example of the plated metal bonding apparatus 1 shown in FIG. 1A. Specifically, FIG. 2A shows the overall configuration of the actual apparatus. FIG. 2B shows an actuator portion shown in FIG. 2A.

FIG. 2C is a diagram showing a schematic configuration of a sound rotary system. With such an arrangement, the horn is vibrated in a horizontal vibration mode or a vertical vibration (radial vibration) mode, and is rotationally driven. The horn thus vibrated and rotationally driven transmits sound energy to the parts. This allows metals to be continuously bonded, and resins to be continuously welded.

FIGS. 2D and 2E are diagrams for explaining the horizontal vibration and the vertical vibration, respectively. The vibration mode supported by the horn changes depending on the shape of the horn. Examples of such vibration modes include the horizontal vibration mode and the vertical vibration mode. In the horizontal vibration mode, the horn is vibrated based on a given wavelength, and the vibration propagates as horizontal vibration parallel to the horizontal direction with the center of vibration propagation as the center of the horn, which functions as the maximum vibration amplitude point. The horizontal vibration mode is mainly used for sound metal bonding. On the other hand, in the vertical vibration mode, the horn is vibrated based on a given half wavelength, and the amplitude of the vibration is distributed to radial directions with the center of vibration propagation as the center of the horn, which functions as the maximum stress point, thereby providing vertical vibration. The vertical vibration mode is mainly used for sound resin welding.

Figure 3A:
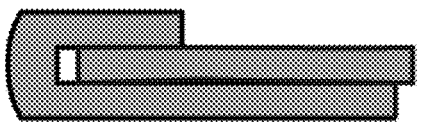
FIG. 3A is a diagram showing a first bonding example in a case in which a first metal 19 and a second metal 21 shown in FIG. 1A are each galvanized iron.
Figure 3B:
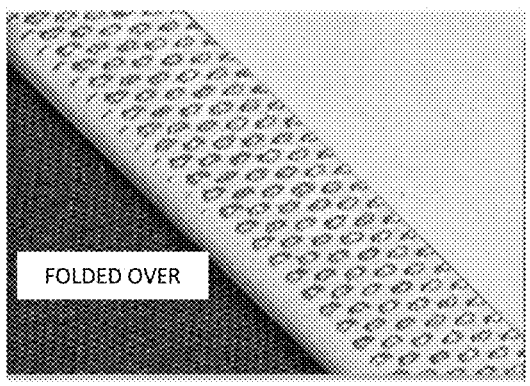
FIG. 3B is a diagram showing a bonding portion.
Figure 3C:
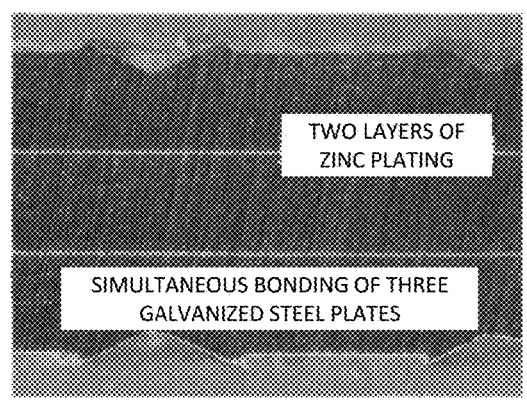
FIG. 3C is a cross-sectional diagram showing the bonding portion.
Figure 3D:
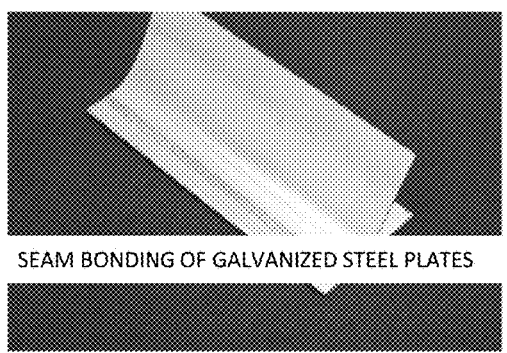
FIG. 3D shows a seam bonding of galvanized steel plates.
Figure 3E:
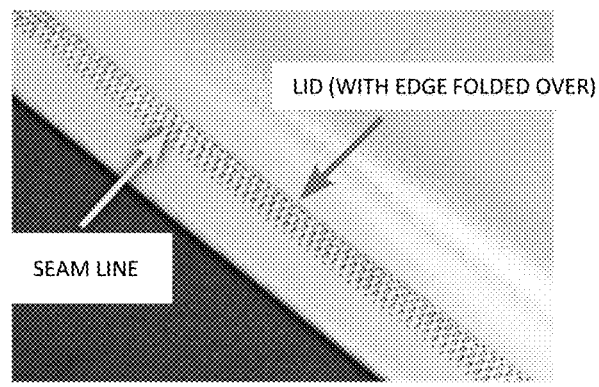
FIG. 3E is an enlarged diagram of FIG. 3D.

Each of FIGS. 3A-3E is a diagram showing a first bonding example in a case in which the first metal 19 and the second metal 21 are each configured as galvanized steel. As shown in FIG. 3A, an edge of the first metal 19 is folded over such that the second metal 21 is interposed between the edge portions thus folded over. Specifically, a galvanized steel plate is set such that its edge is folded over, and is arranged such that another galvanized steel plate with the same material properties is pinched by the edge portions thus folded over. Subsequently, seam bonding is performed using the above-described rotary intermittent generation apparatus (apparatus configured to vibrate the horn in an intermittent manner, and to rotationally drive the horn by a motor in a period in which the horn is not vibrated). Each galvanized steel plate is configured to have a thickness of 0.6 mm and an outer size of 200 mm. The bonding conditions are a frequency of 15 kHz, a vibration amplitude of 20 μm, a pressure of 1000 N, a generation period of 1.0 second, a cooling period of 1.0 second, an advancing period of 0.3 seconds, and seam width of 5 mm. FIG. 3B is a diagram showing a bonding portion. FIG. 3C is a cross-sectional diagram showing the bonding portion. FIG. 3C shows a state in which each layer is closely bonded to the corresponding layer. It can be confirmed from FIG. 3D that detachment does not occur even if the bonded materials are bent after the bonding. FIG. 3E is an enlarged diagram of FIG. 3D.

Figure 4A:
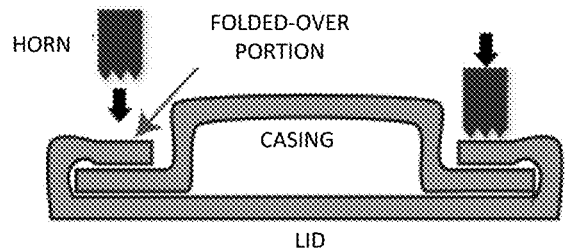
FIG. 4A is a diagram showing a second bonding example in a case in which a first metal 19 and a second metal 21 shown in FIG. 1A are each galvanized iron.
Figure 4B:
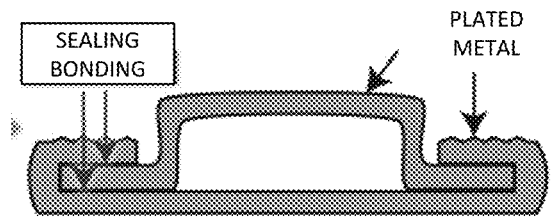
FIG. 4B shows a state in which the sealing bonding has been performed.
Figure 4C:
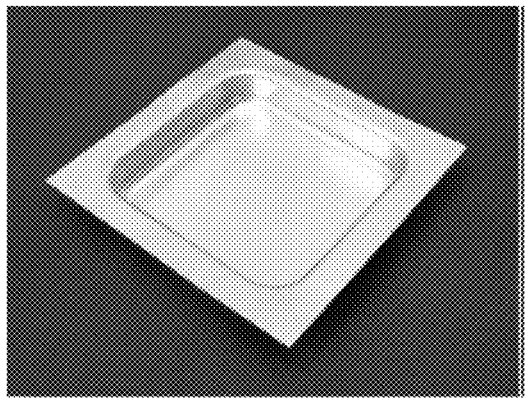
FIG. 4C shows the casing.
Figure 4D:
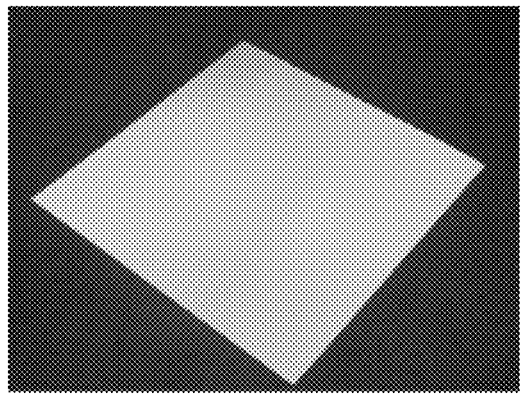
FIG. 4D shows the lid.
Figure 4E:
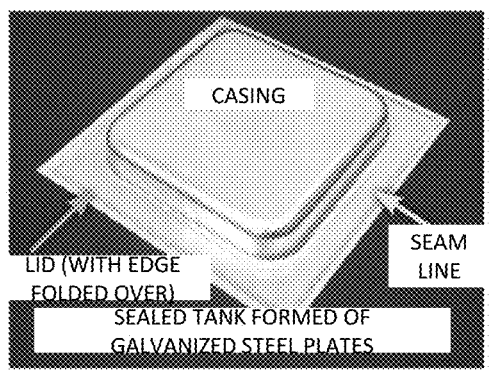
FIG. 4E shows the tank that was actually manufactured.
Figure 4F:
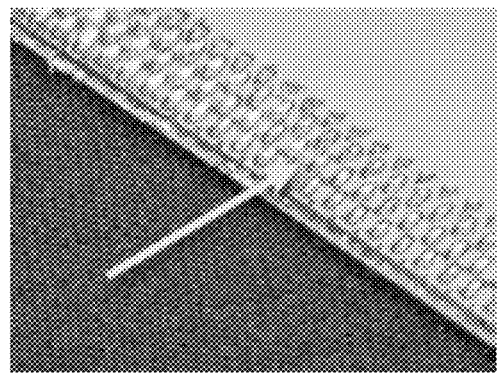
FIG. 4F is an enlarged diagram showing a sealing bonding portion in a case in which the bonding processing is performed with the same conditions without folding over the four sides of the lid.

Each of FIG. 4A and FIG. 4B is a diagram showing a second bonding example in a case in which the first metal 19 and the second metal 21 are each galvanized steel. In this example, a casing formed of a galvanized steel plate was bonded to a lid formed of the same material as follows. That is to say, the four sides of the lid were each folded over so as to fix the casing and the lid. Subsequently, the four side portions were subjected to seam bonding using the rotary intermittent generation apparatus, so as to manufacture a tank. The bonding was performed with the same conditions and the like as those shown in FIGS. 3A-3E. FIG. 4A shows a state before the bonding in which the lid and the casing are fixed after a lid is folded over. FIG. 4B shows a state in which the sealing bonding has been performed. FIG. 4C shows the casing. FIG. 4D shows the lid. FIG. 4E shows the tank that was actually manufactured. When the tank shown in FIG. 4E was immersed in hot water of 60° C., no air leakage was observed. That is to say, it has been confirmed that such an arrangement allows sealing bonding. FIG. 4F is an enlarged diagram showing a sealing bonding portion in a case in which the bonding processing is performed with the same conditions without folding over the four sides of the lid. In this case, a residual zinc protrusion portion was observed, which is indicated by the arrow. Even in this case, it has been confirmed that, when the tank thus manufactured was immersed in hot water of 75° C. with a depth of 100 mm, no problem has been observed with respect to the sealing bonding.

As described above, with the present invention, "forming machining" is performed in which the horn is vibrated using sound vibration and/or ultrasound vibration above a bonding portion structured such that it is folded over once or multiple times. At the same time, "bonding" is performed while discharging residual plating materials or voids (air or the like) from the bonding portion using sound effects. By performing the close bonding and the discharging processing, "sealing" is also provided. It should be noted that, in a case of employing swaging coupling, rivets may be employed.

Furthermore, with the present invention, in the cooling time (see the cooling times shown in FIG. 1B from $t_4$ up to $t_5$, and from $t_7$ up top $t_8$), such an arrangement is capable of maintaining the application of pressure to the parts while suspending the vibration. This allows the bonding portion to be cooled and solidified, thereby allowing a hermetically sealed state to be fixed.

Moreover, with the present invention, the sound energy excites the atoms in the bonding portion, which allows the atoms to move and migrate freely, thereby removing residual stress after the bonding. This suppresses the occurrence of whiskers and electric corrosion (electric erosion).

Additional description will be made regarding the experiments shown in FIGS. 3A-3E and 4A-4F. The dissolution temperature of zinc is approximately 420° C., and the dissolution temperature of iron is approximately 1000° C. or more. As shown in FIGS. 3A-3E and 4A-4F, in a case in which the bonding is performed for such galvanized steel plates, only the zinc is dissolved at a temperature that is lower than the dissolution temperature of iron, or diffusion bonding is performed in a state in which neither zinc nor iron is dissolved. This bonding can be supported by adjusting the energy to be supplied, which is a bonding condition. With this, it can be anticipated that such an arrangement is capable of avoiding a problem of "hydrogen brittleness". That is to say, with the present invention, such bonding can be supported with low energy and at a low temperature, thereby suppressing the occurrence of hydrogen brittleness. Furthermore, with the present embodiment, such bonding is supported in a room temperature atmosphere. Moreover, with the present invention, "forming machining", "bonding", and "sealing" can be supported at the same time. It should be noted that resistance welding or arc welding have a problem of hydrogen brittleness, leading to a problem in that a stable bonding portion cannot be obtained. Thus, it has been confirmed that the present invention provides a marked advantage.

As described above, an outer edge portion may be folded over, or may not be folded over. In a case in which such an outer edge portion is folded over, bonding is not performed for such a folded-over portion itself. Instead, the sealing is performed for a portion on the inner side of such a folded-over portion. Also, the overall outer edge or a part of the outer edge may be folded over. Also, only a necessary portion may preferably be sealed. That is to say, such sealing may not be necessarily performed for the entire bonding portion.

Figure 5A:
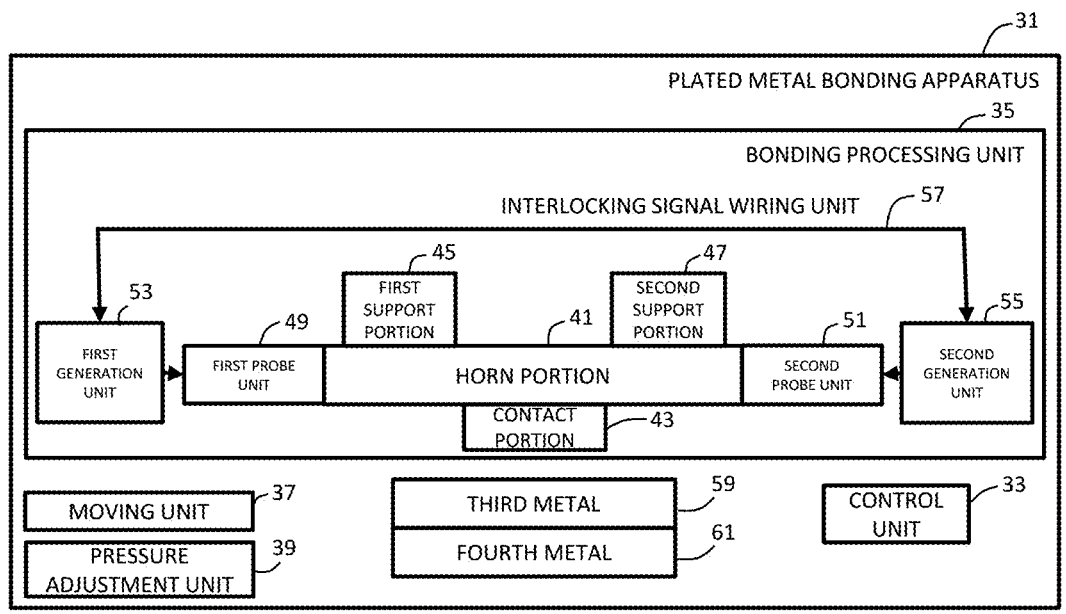
FIG. 5A is a block diagram showing an example configuration of a plated metal machining apparatus 31 according to another embodiment of the present invention.
Figure 5B:
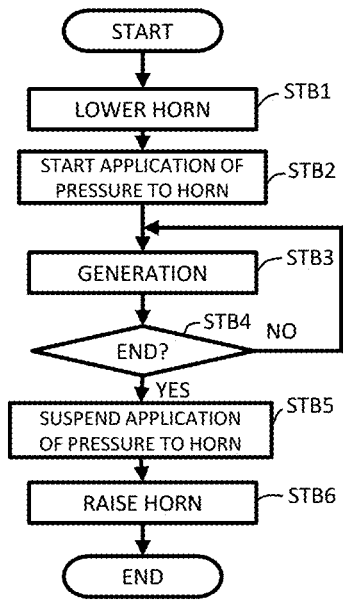
FIG. 5B is a flowchart showing an example of the operation thereof.
Figure 5C:
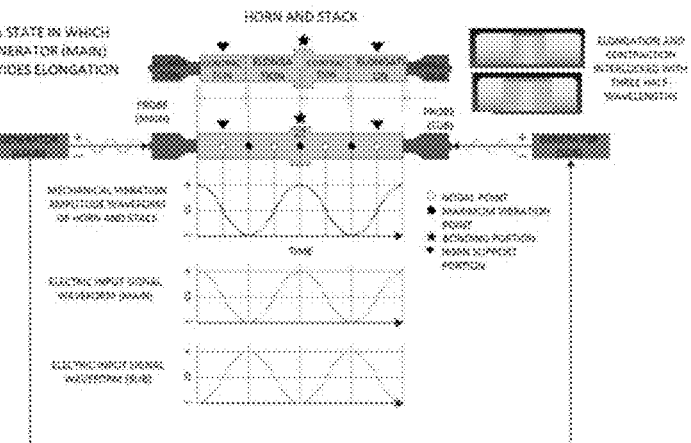
FIG. 5C is a diagram for specifically explaining the operation.

FIG. 5A is a block diagram showing an example configuration of a plated metal bonding apparatus 31 according to another embodiment of the present invention. FIG. 5B is a flowchart showing an example of the operation thereof. FIG. 5C is a diagram for specifically explaining the operation thereof.

Referring to FIG. 5A, the plated metal bonding apparatus 31 includes a control unit 33, a bonding processing unit 35 (an example of a "bonding processing unit" in the present claims), a moving unit 37, and a pressure adjustment unit 39. The bonding processing unit 35 includes a horn portion 41, a contact portion 43, a first support portion 45, a second support portion 47, a first probe unit 49, a second probe unit 51, a first generation unit 53, a second generation unit 55, and an interlocking signal wiring unit 57.

The control unit 33 is capable of controlling the operation of the plated metal bonding apparatus 31 using the control signals. The moving unit 37 controls the up-and-down movement of the horn portion 41 and the contact portion 43. The contact portion 43 is configured to be lowered such that it is pressed in contact with a third metal 59 which is positioned as the uppermost from among the third metal 59 and fourth metal 61. The pressure adjustment unit 39 adjusts the pressure applied by the contact portion 43.

The bonding processing unit 35 performs bonding processing for the third metal 59 and the fourth metal 61 using sound vibration and/or ultrasound vibration. A portion to which such bonding is applied by the bonding processing unit 35 will be referred to as a "bonding portion". At least one from among the third metal 59 and the fourth metal 61 has a bonding portion configured as a plated portion. The third metal 59 and the fourth metal 61 may be, for example, a copper material, aluminum material, iron (steel) material, or the like. Examples of such plating include processing with solder, tin, zinc, nickel, etc.

In the bonding processing unit 35, a first generation unit 53 and a second generation unit 55 each generate an electric signal that corresponds to sound vibration and/or ultrasound vibration. The first probe unit 49 and the second probe unit 51 respectively convert the electric signals output from the first generation unit 53 and the second generation unit 55 into mechanical vibrations. The mechanical vibrations thus converted are transmitted to the horn portion 41. The horn portion 17 is resonated in a state in which it is supported by the first support portion 45 and the second support portion 47. With this, the bonding processing unit 35 is capable of providing bonding processing using sound vibration and/or ultrasound vibration.

FIG. 5B is a flowchart showing an example of the operation of the plated metal bonding apparatus 31. The moving unit 37 lowers the horn portion 41 such that the contact portion 43 is pressed in contact with the third metal 59 (Step STB1). The pressure adjustment unit 39 starts to apply pressure via the contact portion 43 to the third metal 59 and the fourth metal 61 (Step STB2). The bonding processing unit 35 generates the horn portion 41 (Step STB3). The bonding processing unit 35 judges whether or not the generation is to be ended (Step STB4). When judgment has been made that the generation is not to be ended, the processing in Step STB3 is continued. When judgement has been made that the generation is to be ended, the bonding processing unit 35 ends the generation of the horn portion 41, and the pressure adjustment unit 39 suspends the pressing operation via the contact portion 43 (Step STB5). Subsequently, the moving unit 37 raises the horn (Step STB6).

FIG. 5C is a diagram for explaining an example of vibration of the horn portion 41. The horn portion 41 generates multiple nodal points (portions at which minimum vibration occurs) and portions each providing the occurrence of maximum vibration between the nodal points. The first support portion 45 and the second support portion 47 are each arranged at a nodal point. The contact portion 43 is arranged at a portion at which maximum vibration occurs. FIG. 5C shows an example in which the horn portion 41 generates an even number of (four) nodal points. The first generation unit 53 and the second generation unit 55 respectively generate electric signals with opposite phases using the interlocking signal wiring unit. With this, an elongation state and a contraction state alternately occur at each nodal point. With such an arrangement, the bonding processing unit 35 is capable of providing bonding processing for the third metal 59 and the fourth metal 61 using sound vibration and/or ultrasound vibration.

Figure 6A:
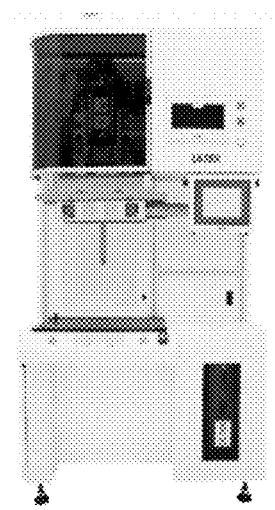
FIG. 6A shows an external view of an apparatus used for creating a bonding example in a case in which a third metal shown in FIG. 5A is a galvanized steel plate, and a fourth metal 61 shown in FIG. 5A is high-tensile steel.
Figure 6B:
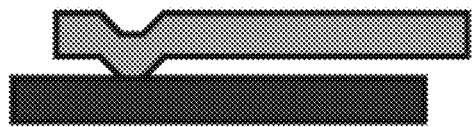
FIG. 6B is a diagram for schematically explaining the bonding.
Figure 6C:
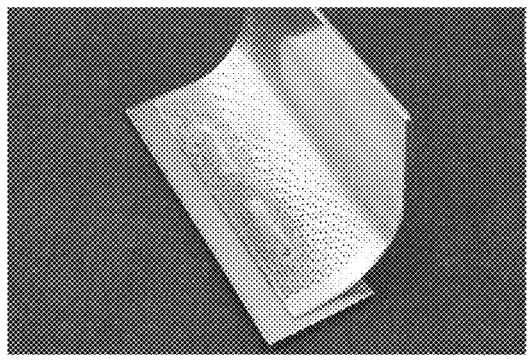
FIG. 6C shows a state confirming that detachment did not occur even if bending was performed after the bonding.
Figure 6D:
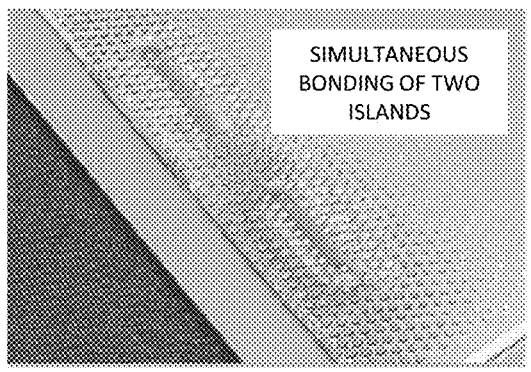
FIG. 6D is an enlarged view of FIG. 6C.
Figure 6E:
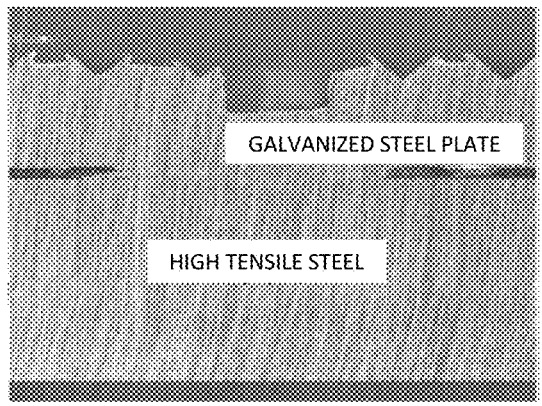
FIG. 6E is a cross-sectional view of the bonding portion.

Each of FIGS. 6A-6E is a diagram showing a bonding example in a case in which the third metal 59 is a galvanized steel plate, and the fourth metal 61 is high tensile steel. FIG. 6A shows an external view of an apparatus used in this example. FIG. 6B is a diagram for schematically explaining the bonding. In this example, the third metal is positioned on the fourth metal 61. The bonding processing is performed from above. FIG. 6C shows a state confirming that detachment did not occur even if bending was performed after the bonding. FIG. 6D is an enlarged view of FIG. 6C. FIG. 6E is a cross-sectional view of the bonding portion. The bonding portion is subjected to the bonding processing in a state in which the zinc plating is discharged.

In particular, in a case in which a metal has been subjected to plating with solder or tin, it can be anticipated that the bonding processing as shown in FIGS. 6A-E is effectively employed. That is to say, solder plating or tin plating has a low dissolution temperature in the vicinity of around 200° C. In contrast, iron has a dissolution temperature of 1000° C. or higher. Accordingly, in a case in which the plating materials are dissolved by sound energy such that they are discharged from the bonding portion, and internal metal layers, i.e., copper layers or brass layers, are directly bonded, such an arrangement provides high bonding strength. It should be noted that solder plating and tin plating have a low dissolution temperature. However, a double-support structure (rigid structure) provides an improved discharge effect due to sound characteristics, thereby allowing such bonding to be provided.

It should be noted that, with the present invention, all the metals may be a plated metal. Also, a part of the metals may be a plated metal.

Also, in cases shown in FIGS. 5A-5C and 6A-6E, a single generator may be provided. Also, two generators may be provided.

Figure 7:
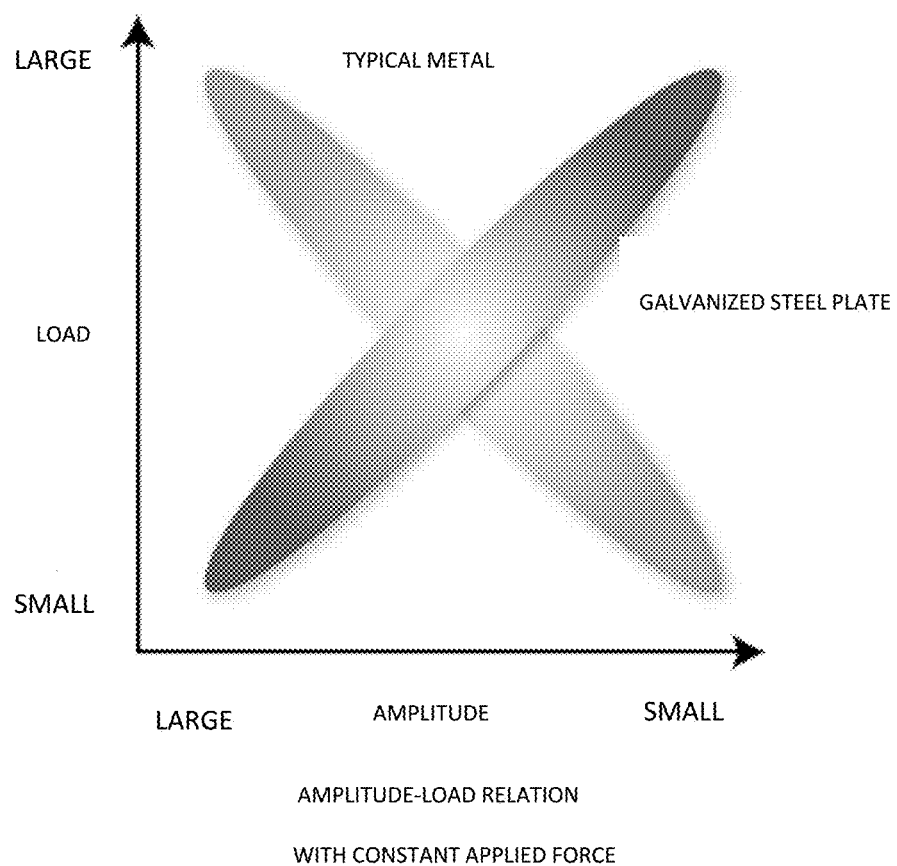
FIG. 7 is a diagram showing a relation between the vibration and the load in a case in which applied force is maintained at a constant value with respect to a case in which typical metals are bonded and a case in which galvanized steel plates are bonded.

FIG. 7 is a diagram showing a relation between the amplitude and the load in a case in which applied force is maintained at a constant value. With typical bonding using sound vibration and/or ultrasound vibration, as the amplitude of vibration applied to the bonding horn becomes higher, the load on the generator becomes larger (see the tendency of typical metal shown in FIG. 7). However, in a case in which such bonding is performed for a galvanized steel plate, there is a large difference in the melting point between zinc and a steel plate. Accordingly, there is a need to distinguish between a case in which two galvanized steel plates are bonded and a case in which a galvanized steel plate and a different kind of metal plate are bonded. That is to say, there is a difference in the load between such cases.

In a case in which two galvanized steel plates are bonded, the amplitude-load relation exhibits the tendency of the galvanized steel plate shown in FIG. 7. That is to say, as the amplitude is raised, the load becomes smaller. Conversely, as the amplitude is lowered, the load becomes larger. The melting point of zinc is approximately 420° C. Accordingly, in a case in which the vibration is applied with a large amplitude at a low frequency, this arrangement allows the zinc atoms to be displaced in a relatively simple manner. That is to say, as the amplitude of the vibration becomes larger, the temperature becomes closer to the melting point. In this state, the horn can be driven with lighter force, and the load is lowered. In this case, there is no need to raise the temperature of the steel plate.

In a case in which a galvanized steel plate and a different kind of metal are bonded, the amplitude-load relation exhibits the tendency of the typical metal shown in FIG. 7. That is to say, as the amplitude is raised, the load becomes larger. Conversely, as the amplitude is lowered, the load becomes smaller. In order to secure the bonding strength, there is a need to discharge zinc plating layers, and to directly bond internal metal layers. In this case, as the bonding condition, vibration is required with a large amplitude and large applied force. Accordingly, the load becomes larger in proportion to the amplitude of the vibration. By employing the bonding processing using sound vibration and/or ultrasound vibration, i.e., using sound or ultrasound energy, as appropriate, such an arrangement allows high-quality bonding to avoid a problem of "hydrogen brittleness" and to be obtained without involving residual stress in a room-temperature atmosphere.

REFERENCE SIGNS LIST 1, 31 plated metal bonding apparatus, 3, 33 control unit, 5, 35 bonding processing unit, 7 pressing portion, 9 electric signal generation unit, 11 probe unit, 13 right-side driving unit, 15 left-side driving unit, 17 horn portion, 43 contact portion, 45 first support portion, 47 second support portion, 49 first probe unit, 51 second probe unit, 53 first generation unit, 55 second generation unit, interlocking signal wiring unit, 59 third metal, 61 fourth metal.

The invention claimed is:

1. A plated metal bonding method for bonding a plurality of metals, comprising bonding in which a bonding processing unit bonds a plurality of metals using sound vibration and/or ultrasound vibration,
    wherein the plurality of metals comprises a first metal and a second metal,
    wherein the first metal has a first plated bonding portion where the bonding is to be performed,
    wherein the second metal has a second plated bonding portion where the bonding is to be performed, the bonding processing unit performs the bonding using— the first plated bonding portion and the second plated bonding portion and discharges a residual plating material, which has not been used for the bonding, from the first and second plated bonding portions by the sound vibration and/or the ultrasound vibration.

2. The plated metal bonding method according to claim 1, wherein, in the bonding, the bonding processing unit performs bonding for a bonding portion at a temperature that is not higher than a dissolution temperature of a plating material.

3. The plated metal bonding method according to claim 1, wherein the first plated bonding portion comprises a first bonding portion and a second bonding portion to be subjected to bonding after the bonding of the first bonding portion,
    wherein
    a pressing portion applies a pressure to the first and second plated bonding portions since at least the bonding of the first bonding portion is performed until the bonding of the second bonding portion is performed,
    the bonding processing unit performs the bonding of the first bonding portion by vibrating a horn with the sound vibration and/or the ultrasound vibration, followed by moving the first metal and the second metal without vibrating the horn, and then performs the bonding of the second bonding portion by vibrating the horn, and a time during which the horn is not vibrated is longer than a time during which the first metal and the second metal are moved.

4. The plated metal bonding method according to claim 1, wherein, in the bonding, pressure is applied to the first plated bonding portion by the bonding processing unit and/or a pressing portion.

5. The plated metal bonding method according to claim 1, wherein the bonding processing unit performs the bonding in a state in which the first metal is bent in a state in which the second metal is pinched by the first metal.

* * * * *